J. F. & R. I. WILSON.
PLOW.
No. 189,981. Patented April 24, 1877.
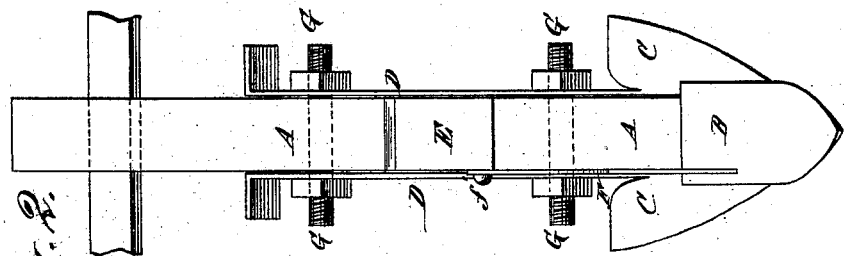
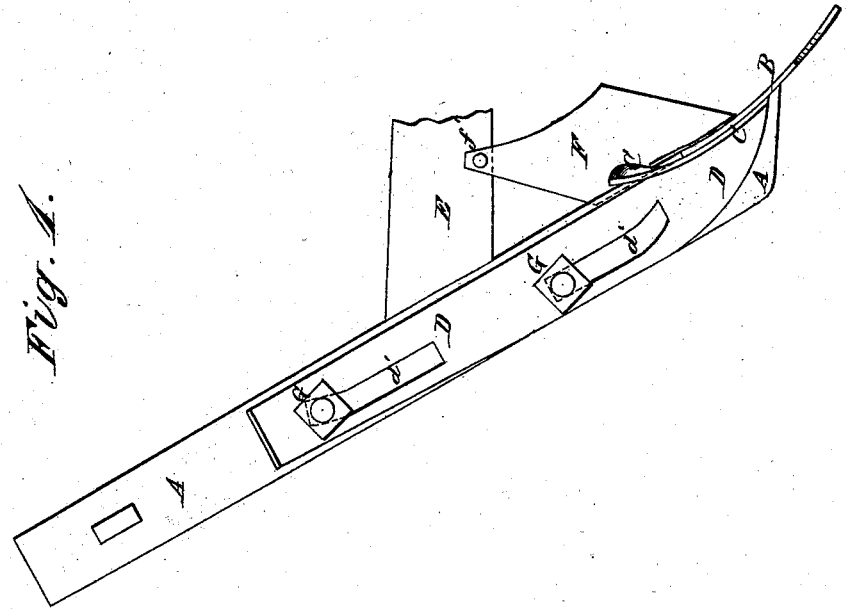
WITNESSES:
INVENTORS

UNITED STATES PATENT OFFICE.

JAMES F. WILSON AND RICHARD I. WILSON, OF CALHOUN, GEORGIA.

IMPROVEMENT IN PLOWS.

Specification forming part of Letters Patent No. 189,981, dated April 24, 1877; application filed March 3, 1877.

*To all whom it may concern:*

Be it known that we, JAMES F. WILSON and RICHARD I. WILSON, of Calhoun, in the county of Gordon and State of Georgia, have invented a new and useful Improvement in Plows, of which the following is a specification:

Figure 1 is a front view of our improved plow. Fig. 2 is a side view of the same.

Similar letters of reference indicate corresponding parts.

The object of this invention is to furnish an improved plow provided with wings in such a way that they may be raised out of, and lowered into, working position separately or both together, as may be desired, to adapt it for use in various kinds of plowing, and which may be adjusted to prevent small plants from being covered or injured by having soil thrown upon them, and which shall be simple in construction, and easily and quickly adjusted. The invention consists in the combination of the adjustable wings, the slotted sliding bars, and their clamping-bolts, with the plow-standard and the plow-plate, as hereinafter fully described.

A is the standard, which is attached to the rear end of the beam E, and which projects above said beam, to serve as a handle. To the forward side of the lower end of the standard A is attached a bull-tongue or other plow-plate, B. C are the wings, which are attached to or formed upon the lower ends of two bars, D, in such positions that, when lowered, their inner edges may underlap and fit snugly beneath the side edges of the plow-plate B. The bars D pass up along the sides of the standard A, and have slots $d'$ formed in them, to receive the bolts G, by which they are secured to said standard A. The slots $d'$ are slightly curved, so that when the bars D are started upward, they may draw the wings C back from the plow-plate B, to enable the said wings to move up freely, and so that when moved down the said wings C may be moved up snugly against the rear side of the edges of the plow-plate B. With this construction both the wings C may be lowered, as shown in Fig. 1, to adapt the plow for use as a shovel-plow, or one wing may be raised to adapt the plow for use where it is desired to throw the earth to one side, or the wings may be raised and lowered alternately as the plow is drawn back and forth, to adapt it for use as a side-hill plow. The adjustable wings also enable the plow to be used for subsoiling, and enable the plow to work very close to the plants when desired. To the beam E, a little in front of its rear end, is pivoted a plate, F, by a bolt, $f'$, so that it may be turned down, as shown in Fig. 1, to serve as a guard or fender to prevent small plants from being covered or injured by the soil thrown by the plow. When not required for use the fender F may be turned up out of the way.

Having thus described our invention, we claim as new and desire to secure by Letters Patent—

The combination of the adjustable wings C, the slotted sliding bars D, and the bolts G, with the plow-standard A, and the plow-plate B, substantially as herein shown and described.

JAMES F. WILSON.
RICHARD I. WILSON.

Witnesses:
WILLIAM H. BLOCK,
HAYDON F. FERGUSON.